BINARY ADDING AND SUBTRACTING DEVICE

Filed June 29, 1955 4 Sheets-Sheet 1

INVENTOR
EDWARD W. YETTER
BY Charles C. English
AGENT

Jan. 7, 1958 E. W. YETTER 2,819,019

BINARY ADDING AND SUBTRACTING DEVICE

Filed June 29, 1955 4 Sheets-Sheet 2

INVENTOR
EDWARD W. YETTER

BY Charles C. English
AGENT

BINARY ADDING AND SUBTRACTING DEVICE

Filed June 29, 1955 4 Sheets-Sheet 3

INVENTOR
EDWARD W. YETTER
BY Charles C. English
AGENT

BINARY ADDING AND SUBTRACTING DEVICE

Filed June 29, 1955 4 Sheets-Sheet 4

INVENTOR.
EDWARD W. YETTER
BY
Charles C. English
AGENT

United States Patent Office
2,819,019
Patented Jan. 7, 1958

2,819,019

BINARY ADDING AND SUBTRACTING DEVICE

Edward W. Yetter, Chadds Ford, Pa., assignor to Sperry Rand Corporation, Philadelphia, Pa., a corporation of Delaware Application June 29, 1955, Serial No. 518,909

26 Claims. (Cl. 235—61)

This invention relates to devices for effecting binary addition and/or subtraction, and more particularly to such devices employing a plurality of magnetic cores.

It has been previously known that binary addition and subtraction may be accomplished with devices employing vacuum tubes and the like, but such devices have numerous disadvantages which are overcome by the present invention which operates along the lines of magnetic amplifiers. The magnetic amplifier circuit is inherently pulse-forming, and therefore devices operating on the principle of pulse outputs are well adapted to be used with other types of magnetic amplifier apparatus to form a complete system. One use of the present invention would therefore be in connection with a complete system employing magnetic amplifiers.

One object of this invention is to provide a device for binary addition and/or subtraction which has the pulse-forming characteristics of magnetic amplifier devices.

Another object of the invention is to provide a device for binary addition and/or subtraction which is effective and reliable for performing these functions.

Still another object of the invention is to provide a device for binary addition and subtraction in which there are no vacuum tubes or other elements likely to burn out.

Still another object of the invention is to provide a device for binary addition and/or subtraction which is low in cost.

A further object of the invention is the provision of a device for binary addition or subtraction which is reliable in operation.

In carrying out the invention, a plurality of magnetic cores are employed, each having several groups of coils thereon. A group of input coils controls the resetting of the cores according to the binary signals to be added or subtracted, as the case may be. Another group of coils on the cores produces a sum output. A third group of coils on the cores is so arranged as to produce a carry output and a fourth group of coils on the cores is arranged to produce a borrow output. Magnetic switching means may be employed to select either the carry output or the borrow output, so that the device may be used for either addition or subtraction.

Figure 1:
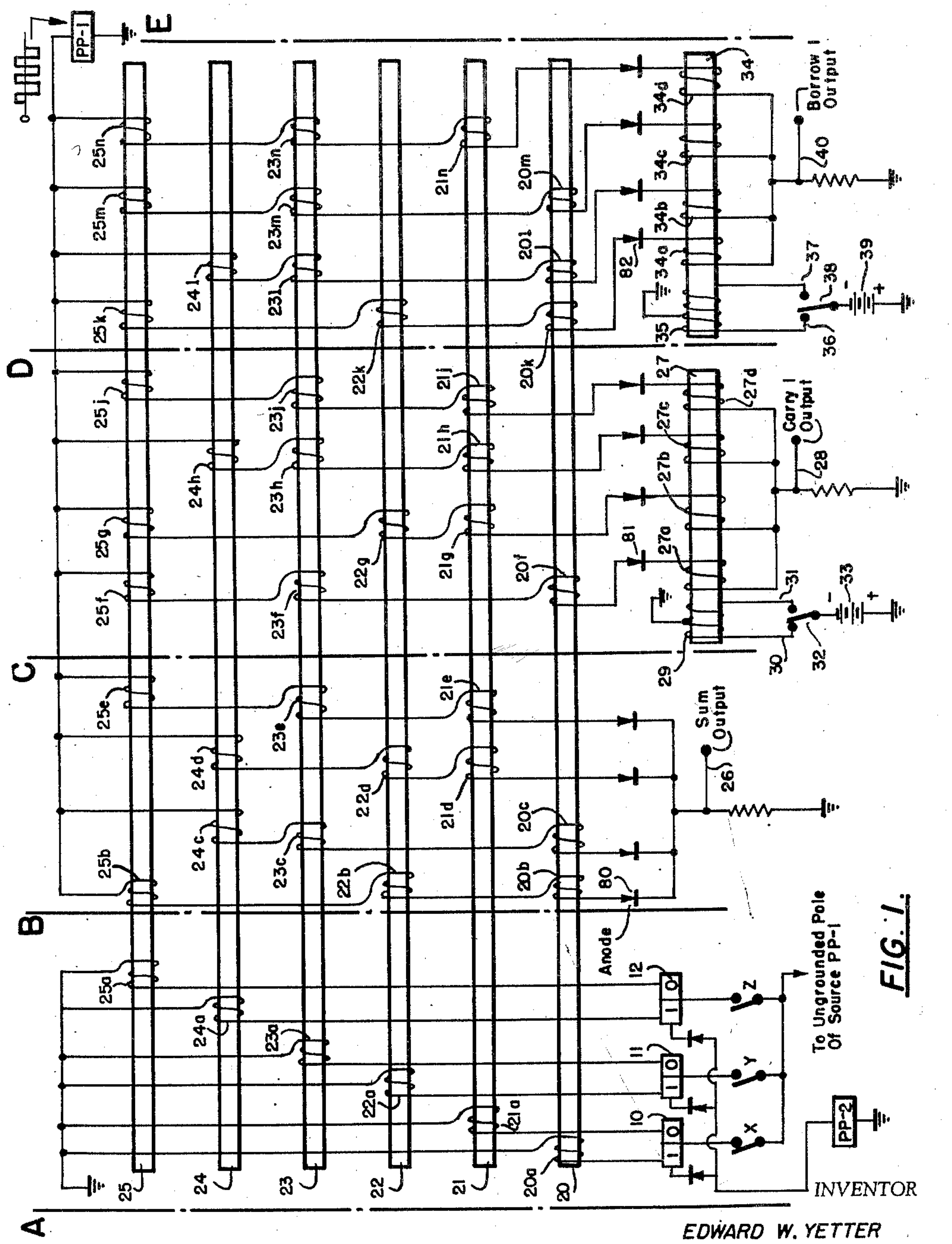
Figure 1 is a schematic diagram of the invention.
Figure 2:
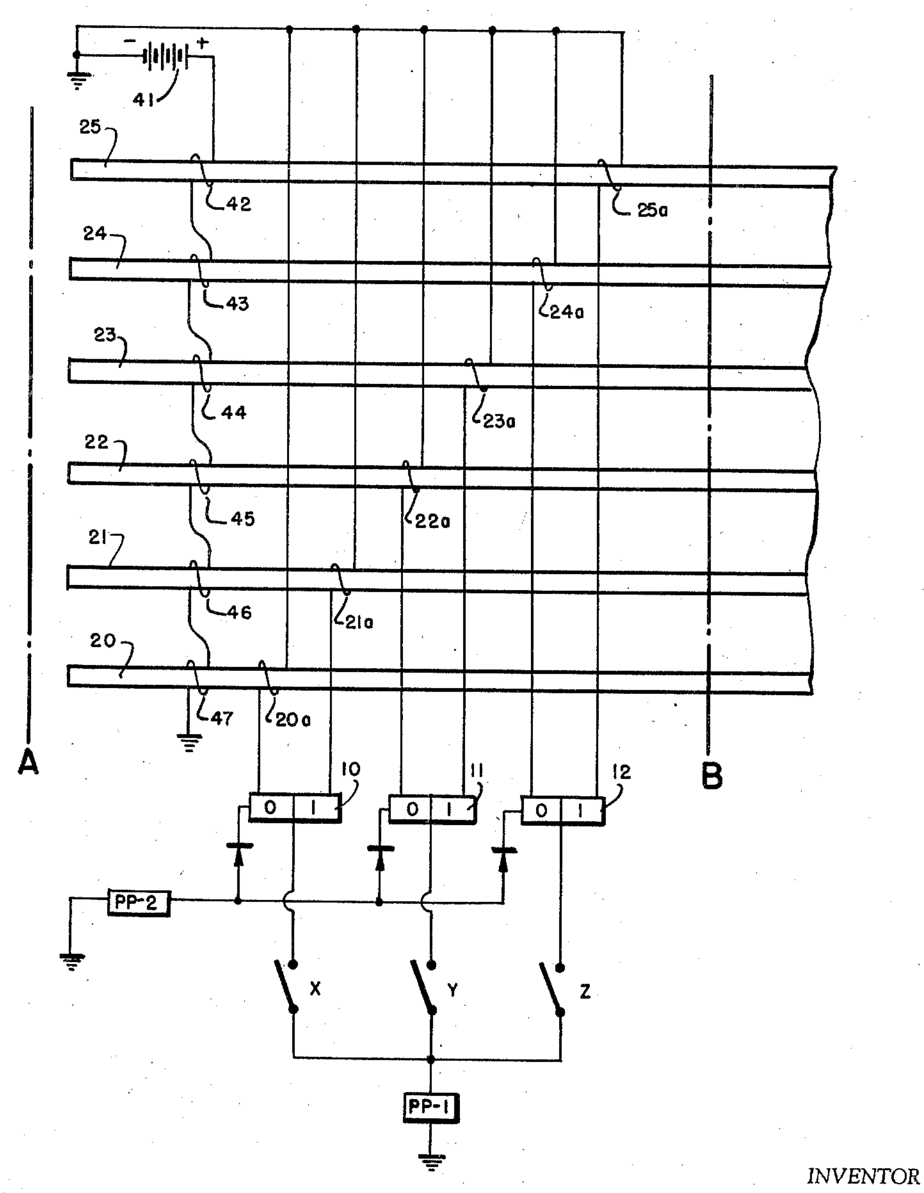
Figure 2 is a schematic diagram of a modified form of the input section A—B, of the device of Figure 1.
Figure 3:
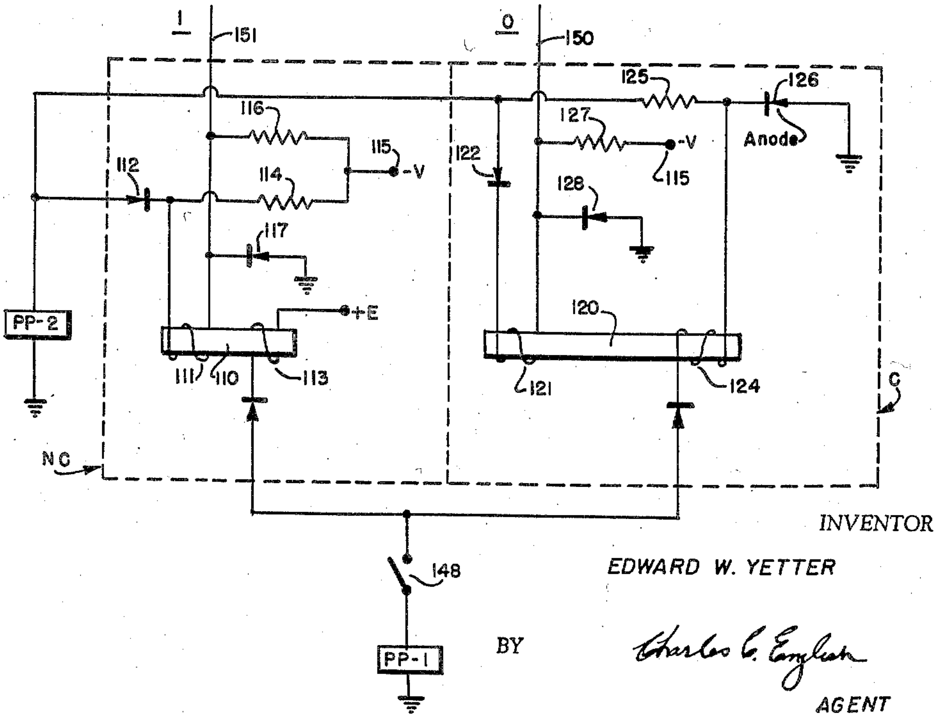

Figure 3 illustrates one form which the circuits 10, 11, and 12 of Figures 1 and 2 may take.

Figure 4:
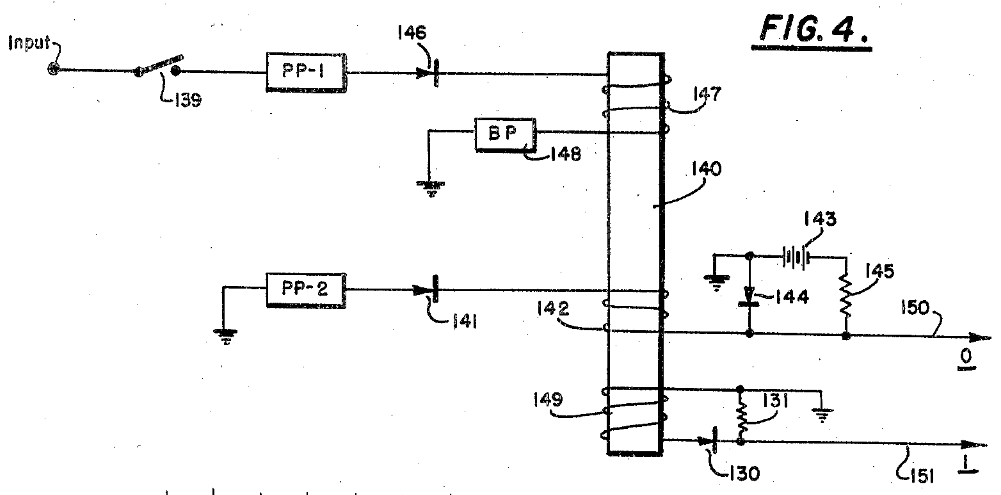
Figure 5:
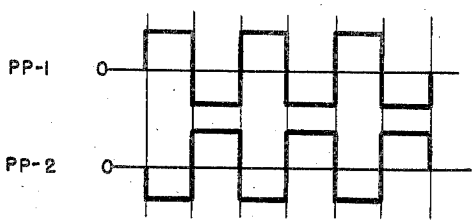

Figure 4 illustrates another form which the circuits 10, 11, and 12 of Figures 1 and 2 may take; and Figure 5 is a timing diagram for the device of Figures 1, 2, 3, and 4.

Figure 6:
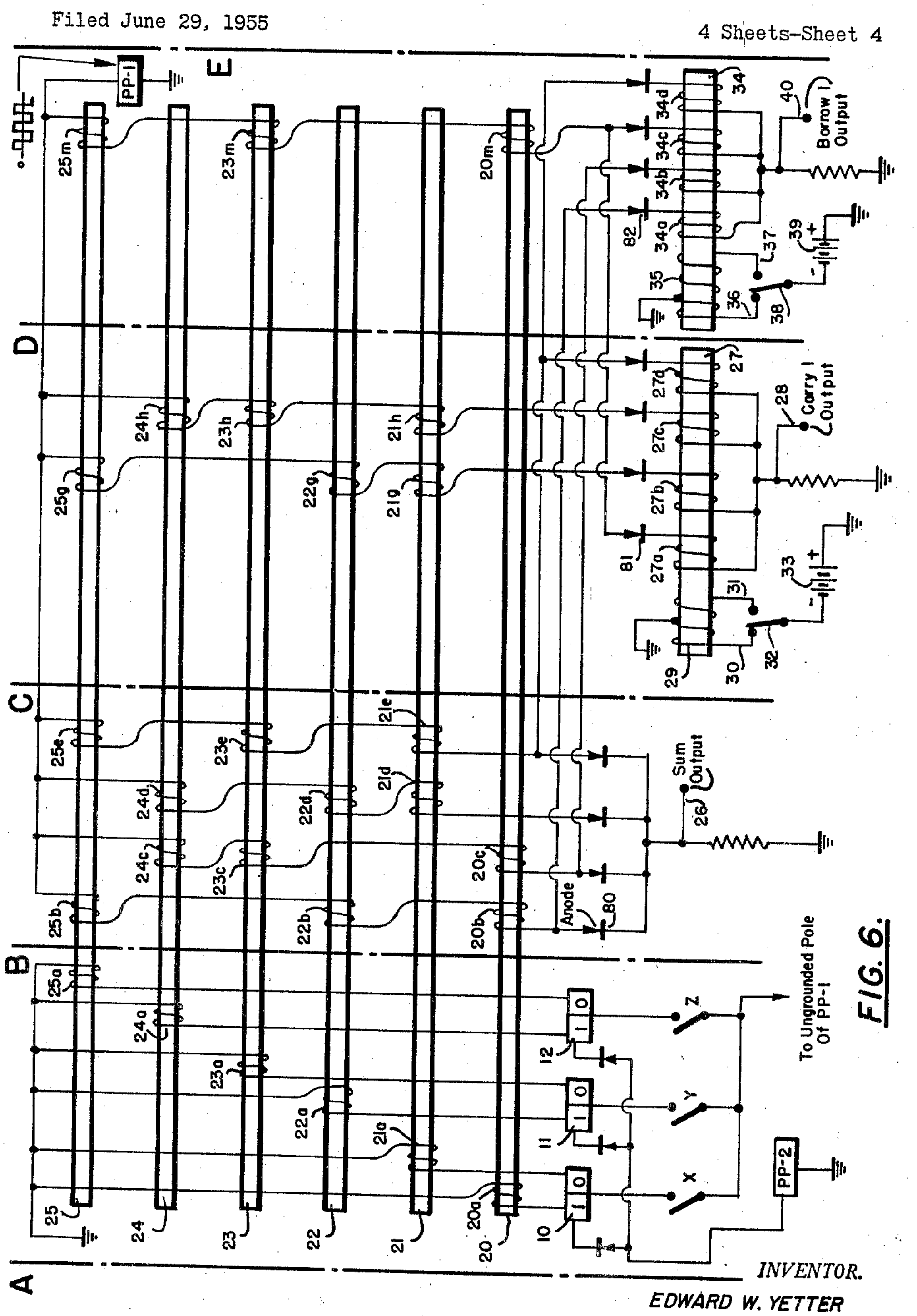

Figure 6 is a schematic diagram of a modified form of Figure 1.

The cores of the magnetic amplifiers hereinafter referred to may be made of a variety of materials, among which are the various types of ferrites and the various magnetic tapes, including Orthonik and 4–79 Molypermalloy. These materials may have different heat treatments to give them different properties. The magnetic material employed in the cores should preferably, but not necessarily, have a substantially rectangular hysteresis loop. Cores of this character are well known in the art. In addition to the wide variety of materials available, the cores may be constructed in a number of geometries including both closed and open paths; for example, cup-shaped, strips, and toroidal-shaped cores are possible. Those skilled in the art understand that when the core is operating on the horizontal (or substantially saturated) portions of its hysteresis loop, the core is generally similar to an air core, in that the coil on the core is of low impedance. On the other hand, when the core is operating on the vertical (or unsaturated) portions of the hysteresis loop, the impedance of the coil on the core will be high.

As shown in Figure 1, the device has six magnetic cores 20 to 25 inclusive, having input coils 20*a* to 25*a* inclusive, thereon. These input coils are controlled by three input signal control circuits 10, 11, and 12 which may be selectively energized by signals controlled by switches X, Y, and Z respectively. Whenever switch X is open, indicating that the binary signal "0" is being fed into control circuit 10, that circuit will not have an output pulse through coil 20*a* but will have one through coil 21*a*. Such an output pulse will appear in response to a positive excursion of source PP–2 which is connected to the circuit 10. This operation is described in detail in connection with Figures 3 and 4, below. In event switch X is closed, representing that binary signal "1" is applied to circuit 10, a positive excursion of source PP–2 will cause a current pulse to flow through coil 20*a* but there will be no pulses through coil 21*a*. In like manner, circuits 11 and 12 pass a positive excursion of source PP–2 out the "0" side of the circuit (to coil 23*a* or 25*a* as the case may be), when the input switch Y or Z, as the case may be, is open. These circuits also allow a positive excursion of source PP–2 to pass through the "1" side of the apparatus to coil 22*a* or 24*a*, as the case may be, when the input switch Y or Z, as the case may be, is closed.

When the system is used for addition, switches X and Y represent the two binary numbers to be added and switch Z represents the carry input. When the system is used for subtraction, switches X and Y represent the two binary numbers to be subtracted while switch Z represents the borrow input.

As will later be explained in connection with Figures 3 and 4, only one output lead of each circuit (10, 11, and 12) produces a pulse at any given instant, and such pulses only occur during positive excursions of source PP–2. The cores 20 to 25 inclusive are normally at positive remanence at the start of the apparatus, and are reset to negative remanence whenever the input coil (for example 23*a*) on the core is energized. To the right of the input section of the device (which is marked off by vertical lines A and B) there are a total of twelve vertical columns of coils. These vertical columns respectively have subscripts on their coils running from *b* to *n* inclusive (the letter *i* excluded); and all of these coils are so connected to source PP–1 that they tend to apply positive magnetizing forces to the cores. If a given core is reset by its input coil during the spaces between two positive excursions of source PP–1, all of the coils on that core will present high impedance to the second of the two positive excursions of source PP–1. From the foregoing it is apparent that source PP–2 operating through circuits 10 through 12 functions to reset the cores 20 through 25 during the negative half cycles of PP–1. In this connection it should be recognized that during this resetting action the combined voltages induced in any given vertical set of the serially connected coils, unless certain precautions are taken, may prevent core reset. This effect can be overcome in a number of ways; a typical example would be to make the negative half cycles of PP–1 larger than the combined voltages induced in any given vertical set of its serially connected coils.

If a core has not been reset during the spaces between the positive excursions of source PP–1, the next positive excursion of that source will find low impedance in all of the coils on such core. Hence, in determining whether or not any given coil has high or low impedance to a positive pulse from source PP–1, it is necessary to determine whether that core was reset immediately prior to the pulse. If it was, the coil will have high impedance and if not, the coil will have low impedance. A positive pulse from source PP–1 will readily flow through a vertical column of coils only if all of the coils in the column have low impedance. If any one coil has high impedance, the whole column will have high impedance and current will not readily flow therethrough.

It will now be explained how the device acts as a binary adder. In this connection it may be assumed that the portion of the device between vertical dividing lines D and E is omitted. It can also be assumed that the magnetic switch 27 (which includes coils 27*a* to 27*d*, and 29, core 27, switch 32 and battery 33) is omitted and that the coils 27*a* to 27*d* inclusive are either short-circuited or have low impedance throughout this operation. If the binary signal "1" is applied to circuit 10 by the closing of switch X, whereas binary "0" is applied to circuits 11 and 12 by leaving switches Y and Z open, the next positive pulse of source PP–2 will energize coils 20*a*, 23*a*, and 25*a*, thus flipping cores 20, 23, and 25. All of the coils on these three cores will have high impedance to the next positive pulse of source PP–1. All of the coils on the remaining cores 21, 22, and 24 will have low impedance to that same positive pulse. The only vertical column of coils wherein all coils will have low impedance is the one containing coils 21*d*, 22*d*, and 24*d*. Hence, the next positive excursion of source PP–1 will readily flow through those three coils to the "sum" output 26. At least one coil in each vertical column leading to "carry" output 28 will have high impedance and therefore substantially no current will arrive at carry output 28.

If it next be assumed that binary "0" signals are fed to circuits 10 and 12 by leaving the switches X and Z open, and that a binary "1" is fed to circuit 11, then coils 21*a*, 22*a*, and 25*a* will be energized, flipping cores 21, 22, and 25. All the coils on these cores will have high impedance to the next positive pulse of source PP–1 and the remaining coils will have low impedance. The only vertical column of coils with low impedance will be coils 20*c*, 23*c*, and 24*c*. Hence, the next positive excursion of source PP–1 will flow to sum output 26, but not to carry output 28.

In event switch Z is closed and X and Y remain open, coils 21*a*, 23*a*, and 24*a* are energized, flipping cores 21, 23, and 24. The coils on these cores have high impedance to the next positive pulse of PP–1 and the remaining coils low impedance. In this case the vertical column containing coils 20*b*, 22*b*, and 25*b* is the only one in which all the coils have low impedance and hence, current will flow to the sum output 26 but not to the carry output 28.

If it is next assumed that switches X and Y are closed and Z remains open, coils 20*a*, 22*a*, and 25*a* are energized, flipping cores 20, 22, and 25. The coils on these cores have high impedance to the next positive pulse of source PP–1. The other cores remain at positive remanence and their coils all have low impedance. The vertical column containing coils 21*h*, 23*h*, and 24*h* is the only one in which all of the coils have low impedance and therefore current flows to the carry output 28 but not to the sum output 26.

If it is next assumed that switches X and Z are the only ones closed with switch Y remaining open, it is noted that coils 20*a*, 23*a*, and 24*a* are energized, whereby all the coils on cores 20, 23, and 24 have high impedance to the next positive pulse of PP–1 and the remaining coils have low impedance. The vertical column containing coils 21*g*, 22*g*, and 25*g* is the only one having low impedance, hence, the next positive excursion of source PP–1 may readily flow through this series of coils to carry output 28 but may not flow to the sum output 26 since there is at least one high impedance coil in each of the four paths leading to the sum output 26.

If switches Y and Z are closed with switch X remaining open, cores 21, 22, and 24 are flipped and the coils thereon have high impedance, the remaining coils having low impedance. The only vertical column of coils having low impedance is the one containing coils 20*f*, 23*f*, and 25*f*. Hence, the next positive pulse from source PP–1 flows to carry output 28 but does not flow to sum output 26.

If all three switches X, Y, and Z are closed, so that coils 20*a*, 22*a*, and 24*a* are energized, cores 20, 22, and 24 are flipped and the coils thereon have high impedance to the next positive pulse of PP–1. The remaining coils have low impedance. There are two vertical columns in which all of the coils thereof have low impedance. First, the vertical column containing coils 21*e*, 23*e*, and 25*e* has low impedance and allows the next positive excursion of source PP–1 to flow to sum output 26. Secondly, the vertical column formed by coils 21*j*, 23*j*, and 25*j* has low impedance and allows the last mentioned pulse from source PP–1 to flow therethrough to the carry output 28. Hence, both the sum output 26 and the carry output 28 are concurrently energized.

It follows from the foregoing, that the device functions as a binary adder since if any one input is energized alone, there is a signal at the sum output 26 only. If any two, but not the third, of the inputs are concurrently energized, there will be no sum output at 26 but there will be a carry output at 28. If all three inputs X, Y, and Z are concurrently energized, there will be signals at both the sum and carry outputs.

In order to analyze the operation of the device when used to subtract binary numbers, it may be assumed that all of the coils between vertical dividing lines C and D are omitted. All the apparatus between vertical dividing lines A to C and D to E is, however, retained. If it now be assumed that it is desired to subtract a binary "1" from a binary "0," the operation would be as follows. The binary "0" would be fed into circuit 10 by leaving switch X open. Binary "1" (to be subtracted) is fed into circuit 11 by closing switch Y, switch Z remaining open. Hence, coils 21*a*, 22*a*, and 25*a* would be energized, flipping cores 21, 22, and 25. All the coils on these cores would have high impedance and the remaining coils would have low impedance. This means that the vertical column containing coils 20*c*, 23*c*, and 24*c* has low impedance, thus giving a signal at the sum output 26. The vertical column containing 20*l*, 23*l*, and 24*l* also has low impedance, giving an output signal at borrow output 40. If it next be assumed that all three switches X, Y, and Z are closed, this represents receipt of binary "1" signals at X and Y to be subtracted from each other and also a borrow signal at Z. Cores 21, 23, and 25 are not flipped and coils 21*e*, 23*e*, 25*e*, 21*n*, 23*n*, and 25*n* all have low impedance whereby there are both sum and borrow outputs. Other binary subtractions may be analyzed according to the principles here already discussed.

If desired, the subtracting section D—E may be employed in the same machine as the adding unit C—D. In other words, the apparatus may be assembled as completely as it appears in Figure 1. In this case it is desirable to use the magnetic switches 27 and 34 which, as stated above, were assumed to be omitted in the previous description. These simply are magnetic switches which enable the coils on the two cores 27 and 34 to be placed either in a high impedance state or a low impedance state. In other words, when it is desired to use the subtracting unit D—E it is possible to operate switch 32 in such a way as to render all the coils on core 27 with high impedance so that the carry output unit 28 will not interfere with the subtracting operation. Likewise, when it is desired to perform an adding function using the section C—D, the switch 38 of the subtracting unit D—E may be moved to a position wherein all of the coils on core 34 have high impedance and therefore prevent any signals from appearing at the borrow output 40.

An explanation of one of these switches 27 and 34 will be sufficient to illustrate the mode of operation of both. Core 27 may be composed of any of the magnetic materials hereinabove mentioned, and has a center-tapped coil 29, the center-tap being grounded. A single pole double-throw switch 32 may feed either half of the coil 29 with current from the battery 33. Assuming that switch 32 is thrown against pole 30, the current from battery 33, flowing through the left-hand side of coil 29 to the center-tap, will saturate core 27 positively. The magnetizing forces due to coils **27*a* to 27*d* also apply positive magnetizing forces to the core. Hence, the core will be saturated at all times and these coils will have low impedance, thus permitting signals to appear at the carry output 28**.

If it is desired to disconnect the carry output 28, switch 32 may be thrown against contact 31, which will cause source 33 to drive the core 27 to negative remanence. Hence, if any signals attempt to flow through any of coils **27*a* to 27*d*, they will tend to drive the core 27 along an unsaturated portion of its hysteresis loop and give the coils on the core high impedance. Hence, no signal will appear at carry output 28. Parts 35, 36, 37, 38, and 39 of section D—E function in the same way as parts 29, 30, 31, 32, and 33** of section C—D.

One important feature of the invention resides in the provision of diodes in each vertical column, for example, diodes 80, 81, and 82. These diodes permit the system to have gain, that is, there is a greater power output from the device than there is input required from the driving circuits 10, 11, and 12. During the negative excursions of source PP–1 the anodes of the aforesaid diodes 80, 81, 82, etc., are all biased, highly negatively, and therefore the diodes are cut off. However, when the source PP–1 goes positive, a large flow of current through a vertical column, wherein all coils have low impedance, is possible.

The device of Figure 1 operates generally along the lines of a complementing magnetic amplifier, in the sense that it has a core which is reset by the input signals during spaces between positive excursions of the main power pulse generator. The device of Figure 2 shows how the input section A—B of Figure 1 may be modified so that it operates in a way closer to the principles of a non-complementing magnetic amplifier. In this figure a battery 41 passes a current through coils 42 to 47 inclusive, tending to set up a magnetizing force opposed to the magnetizing forces of coils **20*a* to 25*a* inclusive. The only differences in the connection of the coils 20*a* to 25*a* are that they are reversed in direction and connected to the opposite sides of the driving circuits 10, 11, and 12, as compared with Figure 1. While coils 42 to 47 tend to reset every core to negative remanence during the spaces between power pulses of source PP–1, the driving circuits 10, 11, and 12** produce currents which prevent such resetting on selected cores and these cores remain at positive remanence during the spaces between power pulses of source PP–1. Hence, the next positive excursion of source PP–1 finds the cores in the same condition as they were in connection with Figure 1, and consequently, the same results will be obtained as were obtained in Figure 1.

Another important feature of the invention resides in the type of driving circuits 10, 11, and 12 that are used. So far as many of the aspects of the invention are concerned, it would be possible to use conventional vacuum tube type flip-flops for these inputs. However, there are important advantages in using devices operating on the principles of the magnetic amplifier, as will now be more fully described.

Driving circuits 10, 11, and 12 of Figures 1 and 2, may be of the type shown in the co-pending application of William J. Bartik, entitled, "Electrical Circuit Having Two or More Stable States," filed April 29, 1955, Serial No. 504,974; or of the type shown in the co-pending application of Theodore H. Bonn, entitled: "Electrical Circuit With Two Stable States" filed March 29, 1955, Serial No. 497,549. Both of these applications disclose flip-flop circuits with set and reset inputs as well as two separate outputs. These circuits have two stable states. Energizing the set input places the device in the first stable state wherein there are pulses at the first output but none at the second output. The device remains in this stable state until the reset output is energized, whereupon pulses appear at the second output but not at the first.

In some cases it is desirable to substitute for the flip-flop circuits shown in said prior applications a modified form of circuit which has two outputs and only one input. When the input is energized, pulses appear only at the first output; and when the input is not energized, pulses appear only on the second output. The latter form of circuit is shown in Figure 3 wherein there is a non-complementing magnetic amplifier NC and a complementing magnetic amplifier C, both fed by a common input switch 148 connected to a source of square wave alternating current power pulses PP–1. The source PP–1 has positive excursions which occur during the spaces between the positive excursions of source PP–2, as shown in Figure 5. When switch 148 is closed, the operation is as follows. During the first positive excursion of source PP–1, a negative magnetizing force on core 110 is set up in coil 113. There is also a positive magnetizing force in the core resulting from flow of current from ground, rectifier 117, power winding 111, resistor 114, to negative source 115. These two magnetizing forces cancel and consequently the core remains at positive remanence. The next positive excursion from source PP–2 flows through rectifier 112, finds low impedance in coil 111 and therefore flows therethrough to output 151.

So long as switch 148 is closed, this operation continues. There is no output at 150 since pulses from source PP–1, flowing through coil 124, reset core 120 to negative remanence. Positive pulses from source PP–1 may flow through coil 124 since at the interval that these positive pulses occur, source PP–2 has gone negative and has caused a flow of current from ground through rectifier 126, resistor 125 to source PP–2. This has lowered the cathode of rectifier 126 to ground potential. Therefore there is a potential difference across coil 124. Since the core 120 is at negative remanence at the time the next positive excursion of source PP–2 occurs, current will flow from that source through rectifier 122, but will find coil 121 with high impedance since any current in that coil will necessarily tend to drive the core 120 from negative to positive remanence. Therefore the output current will be small and in fact will be neutralized by the sneak suppressor 115—127—128 which causes a small flow of current of substantially equal magnitude to the sneak current. Hence, when switch 148 is closed, pulses from source PP–2 will appear at output 151 but not at output 150.

If switch 148 is open, no current will flow in coil 113. Therefore during negative excursions of source PP–2 core 110 will be reset to negative remanence by flow of current from ground, rectifier 117, coil 111, resistor 114, to source 115. The next positive excursion of source PP–2 will therefore tend to drive core 110 from negative to positive remanence, whereby coil 111 will have high impedance and only a small current will be neutralized by the sneak current suppressor 115—116—117, which causes a small flow of current to oppose that tending to flow through the coil 111. On the other hand, there will be output signals at 150 since the input coil 124 will not be energized and core 120 will remain at positive remanence. Therefore coil 121 will have low impedance and will allow the positive excursions of source PP–2 to readily flow therethrough.

Another form of input circuit is shown in Figure 4. This circuit has a core 140 (composed of material with a substantially rectangular hysteresis loop), a power winding 142, an output winding 149, and an input winding 147. Sources PP–1 and PP–2 are square wave alternating current sources which are out of phase with each other so that one goes positive when the other goes negative, all as shown in Figure 5. Blocking pulse generator 148 produces a train of positive pulses which occur in phase with (and of the same duration as) positive excursions of source PP–2. Source BP has no negative excursions.

Assume for purposes of illustration, that the core has remained at or above positive remanence for a substantial period of time, while switch 139 was open. In this situation, the operation of the device is as follows. Coil 147 is not energized. Every positive excursion of source PP–2 flows through rectifier 141, coil 142 to output 150. This drives the core from positive remanence to positive saturation. After each positive excursion of source PP–2 the core returns to positive remanence. There is a signal at output 150. There is very little change of flux in the core during these operations and no signal is induced in output coil 149 and no signal appears at output 151. If it now be assumed that switch 139 is closed so that the next positive pulse of source PP–1 flows through rectifier 146, coil 147 and blocking pulse generator 148, to ground, the action will be as follows, remembering that the positive excursion of source PP–1 occurred during an interval when the potential across blocking pulse generator 148 was zero and at a time when source PP–2 was negative and was therefore cutting off rectifier 141. Positive pulses from source PP–1, flowing through coil 147, will revert that core to negative remanence which will cause a rate of change of flux in coil 149; but since rectifier 130 is connected to oppose the flow of output current in this particular instance, no current flows through resistor 131 or to output 151. However, the next positive excursion of PP–2, flowing through rectifier 141 and coil 142, will tend to drive the core back from negative remanence to positive remanence. Coil 142 will have high impedance during this action and there will be a large rate of change of flux in core 140. Therefore a large induced potential in coil 149 will cause a flow of current through rectifier 130 and resistor 131, producing a pulse at output 151. Due to the high impedance of coil 142, the current flowing therethrough will be small and it will be cancelled by the sneak suppressor 143—144—145. The battery 143 tends to cause a flow of current through the rectifier 144 and the resistor 145 equal and opposite to the sneak current tending to flow through coil 142, when the latter has high impedance, and therefore cancels this current so that none of it appears at the output 150.

It is clear from the foregoing description, that when the input switch 139 is open, a pulse appears at output 150 but not at output 151. On the other hand, when switch 139 is closed, there will be a pulse at the output 151 but none at output 150.

It is clear from the foregoing description that in the case of every binary signal fed into the input circuits 10, 11, and 12, all three of these circuits will have output pulses timed to occur in synchronism with each other. This follows since all outputs of circuits 10, 11, and 12 can only occur during positive excursions of source PP–2.

While, for the sake of simplicity, the inputs have been shown in Figure 2 as simple switches X, Y, and Z (which bear reference numbers 139 and 148 in Figures 4 and 3), it is noted that in a more complete data translating or computing system a circuit or device of much greater complexity than a simple switch would usually be used. Those skilled in the art fully understand this, as well as many ways of doing it, remembering always that it is preferable to feed the triggering pulses into the input coils of circuits 10, 11, and 12 only during spaces between positive pulses of source PP–2 whereby to control the next positive pulse of source PP–2. There are, however, many circuits that could be substituted for circuits 10, 11, and 12 that would produce the required synchronized pulses in one or more of coils 20A to 25A.

Figure 6 is a modified form of Figure 1. It is noted that in Figure 1 the series circuit including coils **20*b*, 22*b*, and 25*b* has coils on the same cores as the series circuit including coils 20*k*, 22*k*, and 25*k*. Likewise, the series circuit including coils 20*c*, 23*c*, and 24*c* has coils on the same cores as the series circuit including coils 20*l*, 23*l*, and 24*l*. Similarly, the series circuit including coils 21*e*, 23*e*, and 25*e* has coils on the same cores as the series circuit including coils 21*j*, 23*j* and 25*j*, and the one including coils 21*n*, 23*n*, and 25*n*. Likewise, the series circuit including coils 20*f*, 23*f*, and 25*f* has coils on the same cores as the series circuit including coils 20*m*, 23*m*, and 25*m*. Therefore many coils may be eliminated by combining together the circuits which are driven by coils from the same group of cores. Figure 6 shows the circuit for doing this. It is noted that in Figure 6 the three coils 20*b*, 22*b*, and 25*b* not only drive the sum output through rectifier 80 but also drive the borrow output 40 through rectifier 82, thus eliminating the three coils 20*k*, 22*k*, and 25*k***. As a result of carrying this principle of eliminating coils as far as possible, a total of fifteen of the coils shown on Figure 1 are eliminated in the circuit of Figure 6.

I claim to have invented:

1. A device for adding and subtracting binary numbers comprising a plurality of groups of cores with two cores in each group, input means for and complementary to each group of cores, each input means having two outputs respectively representing binary "0" and binary "1" and including means for applying a magnetizing force to one core of its complementary group when producing a binary "0" output and for applying a magnetizing force to the other core of its complementary group when producing a binary "1" output, means connected to each input means for causing the latter to produce one or the other of its two outputs, sum output means inductively coupled to said cores for producing a sum output signal, carry output means inductively coupled to said cores for producing a carry output signal, borrow output means inductively coupled to said cores for producing a borrow output signal, and switching means for selectively rendering the carry output means or the borrow output means inoperative.

2. A device for adding and subtracting binary numbers comprising a plurality of groups of cores with two cores in each group, input means for and complementary to each group of cores, each input means having two outputs respectively representing binary "0" and binary "1" and including means for applying a magnetizing force to one core of its complementary group when producing a binary "0" output and for applying a magnetizing force to the other core of its complementary group when producing a binary "1" output, means connected to each input means for causing the latter to produce one or the other of its two outputs, sum output means inductively coupled to said cores for producing a sum output signal, carry output means inductively coupled to said cores for producing a carry output signal, and borrow output means inductively coupled to said cores for producing a borrow output signal.

3. A device for adding binary numbers comprising a plurality of groups of cores with two cores in each group, input means for and complementary to each group of cores, each input means having two outputs respectively representing binary "0" and binary "1" and including means for applying a magnetizing force to one core of its complementary group when producing a binary "0" output and for applying a magnetizing force to the other core of its complementary group when producing a binary "1" output, means connected to each input means for causing the latter to produce one or the other of its two outputs, sum output means inductively coupled to said cores for producing a sum output signal, and carry output means inductively coupled to said cores for producing a carry output signal.

4. A device for subtracting binary numbers comprising three groups of cores with two cores in each group, input means for and complementary to each group of cores, each input means having two outputs respectively representing binary "0" and binary "1" and including means for applying a magnetizing force to one core of its complementary group when producing a binary "0" output and for applying a magnetizing force to the other core of its complementary group when producing a binary "1" output, means connected to each input means for causing the latter to produce one or the other of its two outputs, sum output means inductively coupled to said cores for producing a sum output signal, and borrow output means inductively coupled to said cores for producing a borrow output signal.

5. A device for adding and subtracting binary numbers comprising a plurality of groups of cores with two cores in each group, magnetic amplifier means for and complementary to each group of cores, each magnetic amplifier means having two output coils controlled by at least one magnetic core according to the state of saturation of such core in such a way that when pulses are flowing in one of the output coils they are not flowing in the other and vice versa and input means controlling the saturation of the last named core, each magnetic amplifier means having a coil connected to one of its output coils for magnetizing one of the cores of the group complementary to the magnetic amplifier means and also having a coil connected to the other output coil for applying a magnetizing force to the other core of the group complementary to the magnetic amplifier means, means connected to each magnetic amplifier means for placing the latter in one or the other of two different states of core saturation, sum output means inductively coupled to each of said cores for producing a sum output signal, carry output means inductively coupled to each of said cores for producing a carry output signal, borrow output means inductively coupled to each of said cores for producing a borrow output signal, and switching means for selectively rendering the carry output means inoperative or the borrow output means inoperative.

6. A device for adding and subtracting binary numbers comprising a plurality of groups of cores with two cores in each group, magnetic amplifier means for and complementary to each group of cores, each magnetic amplifier means having two output coils controlled by at least one magnetic core according to the state of saturation of such core in such a way that when pulses are flowing in one of the output coils they are not flowing in the other and vice versa and input means controlling the saturation of the last named core, each magnetic amplifier means having a coil connected to one of its output coils for magnetizing one of the cores of the group complementary to the magnetic amplifier means and also having a coil connected to the other output coil for applying a magnetizing force to the other core of the group complementary to the magnetic amplifier means, means connected to each magnetic amplifier means for placing the latter in one or the other of two different states of core saturation, sum output means inductively coupled to each of said cores for producing a sum output signal, carry output means inductively coupled to each of said cores for producing a carry output signal, and borrow output means inductively coupled to each of said cores for producing a borrow output signal.

7. A device for adding binary numbers comprising a plurality of groups of cores with two cores in each group, magnetic amplifier means for and complementary to each group of cores, each magnetic amplifier means having two output coils controlled by at least one magnetic core according to the state of saturation of such core in such a way that when pulses are flowing in one of the output coils they are not flowing in the other and vice versa and input means controlling the saturation of the last-named core, each magnetic amplifier means having a coil connected to one of its output coils for magnetizing one of the cores of the group complementary to the magnetic amplifier means and also having a coil connected to the other output coil for applying a magnetizing force to the other core of the group complementary to the magnetic amplifier means, means connected to each magnetic amplifier means for placing the latter in one or the other of two different states of core saturation, sum output means inductively coupled to each of said cores for producing a sum output signal, and carry output means inductively coupled to each of said cores for producing a carry output signal.

8. A device for subtracting binary numbers comprising a plurality of groups of cores with two cores in each group, magnetic amplifier means for and complementary to each group of cores, each magnetic amplifier means having two output coils controlled by at least one magnetic core according to the state of saturation of such core in such a way that when pulses are flowing in one of the output coils they are not flowing in the other and vice versa and input means controlling the saturation of the last-named core, each magnetic amplifier means having a coil connected to one of its output coils for magnetizing one of the cores of the group complementary to the magnetic amplifier means and also having a coil connected to the other output coil for applying a magnetizing force to the other core of the group complementary to the magnetic amplifier means, means connected to each magnetic amplifier means for placing the latter in one or the other of two different states of core saturation, sum output means inductively coupled to each of said cores for producing a sum output signal, and borrow output means inductively coupled to each of said cores for producing a borrow output signal.

9. A device for adding and subtracting binary numbers comprising three groups of cores with two cores in each group, input means for and complementary to each group of cores, said cores having substantially rectangular hysteresis loops, each input means having two outputs respectively representing binary "0" and binary "1" and including means for applying a magnetizing force to one core of its complementary group when producing a binary "0" output and for applying a magnetizing force to the other core of its complementary group when producing a binary "1" output, said magnetizing forces resetting their respective cores, means connected to each input means for causing the latter to produce one or the other of its two outputs, sum output means inductively coupled to said cores for sensing said cores and producing a sum output signal when appropriate, said sum output means also including means for setting those cores which were previously reset by the input means, carry output means inductively coupled to said cores for sensing said cores and producing a carry output signal when appropriate and for setting those cores which were previously reset by the input means, borrow output means inductively coupled to said cores for sensing said cores and producing a borrow output signal when appropriate and for setting the cores that were previously reset by said input means, and switching means for selectively rendering the carry output means or the borrow output means inoperative.

10. A device for adding and subtracting binary numbers comprising three groups of cores with two cores in each group, input means for and complementary to each group of cores, said cores having substantially rectangular hysteresis loops, each input means having two outputs respectively representing binary "0" and binary "1" and including means for applying a magnetizing force to one core of its complementary group when producing a binary "0" output and for applying a magnetizing force to the other core of its complementary group when producing a binary "1" output, said magnetizing forces resetting their respective cores, means connected to each input means for placing the latter in one or the other of its two output producing conditions, sum output means inductively coupled to each of said cores for sensing said cores and producing a sum output signal when appropriate, said sum output means also including means for setting those cores which were previously reset by the input means, carry output means inductively coupled to each of said cores for sensing said cores and producing a carry output signal when appropriate and for setting those cores which were previously reset by the input means, borrow output means inductively coupled to each of said cores for sensing said cores and producing a borrow output signal when appropriate and for setting those cores that were previously reset by said input means.

11. A device for adding binary numbers comprising three groups of cores with two cores in each group, there being two groups of cores respectively for two binary numbers to be added and a third group for the carry input signal, input means for and complementary to each group of cores, said cores having substantially rectangular hysteresis loops, each input means having two outputs respectively representing binary "0" and binary "1" and including means for applying a magnetizing force to one core of its complementary group when producing a binary "0" output and for applying a magnetizing force to the other core of its complementary group when producing a binary "1" output, said magnetizing forces resetting the cores, means connected to each input means for causing the latter to produce one or the other of its two outputs, sum output means inductively coupled to said cores for sensing said cores and producing a sum output signal when appropriate, said sum output means also including means for setting those cores which were previously reset by the input means, and carry output means inductively coupled to said cores for sensing said cores and producing a carry output signal when appropriate and for setting those cores which were previously reset by the input means.

12. A device for subtracting binary numbers comprising three groups of cores with two cores in each group, there being one group of cores for each of the two binary numbers to be subtracted and a third group of cores for the borrow input signal, input means for and complementary to each group of cores, said cores having substantially rectangular hysteresis loops, each input means having two outputs respectively representing binary "0" and binary "1" and including means for applying a magnetizing force to one core of its complementary group when producing a binary "0" output and for applying a magnetizing force to the other core of its complementary group when producing a binary "1" output, said magnetizing forces resetting their respective cores, means connected to each input means for causing the latter to produce one or the other of its two outputs, sum output means inductively coupled to each of said cores for sensing said cores and producing a sum output signal when appropriate, said sum output means also including means for setting those cores which were previously reset by the input means, and borrow output means inductively coupled to each of said cores for sensing said cores and producing a borrow output signal when appropriate and for setting the cores that were previously reset by said input means.

13. A device as defined in claim 9, in which said sum output means, said carry output means and said borrow output means include a pulse generator and a plurality of series circuits including a plurality of coils in each circuit positioned on selected cores, and a diode in each series circuit whereby the device has gain, certain of said series circuits having their outputs combined to form the sum output, other of said series circuits having their outputs combined to form the carry output and the remainder of the series circuits having their outputs combined to form the borrow output.

14. A device as defined in claim 10, in which said sum output means, said carry output means and said borrow output means include a pulse generator and a plurality of series circuits including a plurality of coils in each circuit positioned on selected cores, and a diode in each series circuit whereby the device has gain, certain of said series circuits having their outputs combined to form the sum output, other of said series circuits having their outputs combined to form the carry output and the remainder of the series circuits having their outputs combined to form the borrow output.

15. A device as defined in claim 11, in which said sum output means and said carry output means include a pulse generator and a number of series circuits, each series circuit including a plurality of coils located on selected cores, there being a diode in each series circuit thereby to give the device gain, certain of said series circuits having their outputs combined to form the sum output and other of said series circuits being combined to form the carry output.

16. A device as defined in claim 12, in which said sum output means and said borrow output means include a pulse generator and a number of series circuits, each series circuit including a plurality of coils located on selected cores, there being a diode in each series circuit thereby to give the device gain, certain of said series circuits having their outputs combined to form the sum output and other of said series circuits being combined to form the borrow output.

17. A device for adding and subtracting binary numbers comprising three groups of cores with two cores in each group, input means for and complementary to each group of cores, each input means having two outputs respectively representing binary "0" and binary "1" and including means for applying a magnetizing force to one core of its complementary group to reset that core when the input means is producing a binary "0" output without applying any magnetizing force to the second core when the input means is producing said binary "0" output and for applying a magnetizing force to the second core when the input means is producing a binary "1" output without applying a magnetizing force to the first core when the input means is producing said binary "1" output, means connected to each input means for causing the latter to produce one or the other of its two outputs, a pulse generator, a plurality of series circuits each including half as many coils as there are cores, each coil being on one of said cores, each series circuit being fed by said pulse generator, a diode in each series circuit whereby the device has gain, sum output means including some of said series circuits whereby pulses from the pulse generator will find at least one of the series circuits included in the sum output means with low impedance whenever there should be a sum output, said sum output means including a sum output terminal fed by the combined outputs of said series circuits which are included in the sum output means, carrying output means including a plurality of said series circuits whereby at least one series circuit included in the carry output means will have low impedance to a pulse from said pulse generator whenever there should be a carry output, said carry output means including a carry output terminal fed by the combined outputs of the series circuits that are included in the carry output means, borrow output means including a plurality of said series circuits whereby at least one series circuit included in the borrow output means will have low impedance to a pulse from said pulse generator whenever there should be a borrow output, said borrow output means including a borrow output terminal fed by the combined outputs of the series circuits that are included in the borrow output means, and switching means for selectively rendering the carry output means or the borrow output means inoperative.

18. A device for adding and subtracting binary numbers comprising a plurality of groups of cores with two cores in each group, input means for and complementary to each group of cores, each input means having two outputs respectively representing binary "0" and binary "1" and including means for applying a magnetizing force to one core of its complementary group to reset that core when the input means is producing a binary "0" output without applying any magnetizing force to the second core when the input means is producing said binary "0" output, and for applying a magnetizing force to the second core when the input means is producing a binary "1" output without applying a magnetizing force to the first core when the input means is producing said binary "1" output, means connected to each input means for causing the latter to produce one or the other of its two outputs, a pulse generator, a plurality of series circuits each including half as many coils as there are cores, each coil being on one of said cores, each series circuit being fed by said pulse generator, a diode in each series circuit whereby the device has gain, sum output means including those of said series circuits whose coils are located on selected cores so that pulses from the pulse generator will find at least one of the series circuits that is included in the sum output means with low impedance whenever there should be a sum output, said sum output means including a sum output terminal fed by the combined outputs of said series circuits that are included in the sum output means, carry output means including those of said series circuits the coils of which are selectively located on the cores so that at least one series circuit included in the carry output means will have low impedance to a pulse from said pulse generator whenever there should be a carry output, the carry output means including a carry output terminal fed by the combined outputs of the series circuits that are included in the carry output means, and borrow output means including those of said series circuits the coils of which are positioned on selected cores so that at least one series circuit that is included in the borrow output means will have low impedance to a pulse from said pulse generator whenever there should be a borrow output, said borrow output means including a borrow output terminal fed by the combined outputs of the series circuits of the borrow output means.

19. A device for adding binary numbers comprising a plurality of groups of cores with two cores in each group, input means for and complementary to each group of cores, each input means having two outputs respectively representing binary "0" and binary "1" and including means for applying a magnetizing force to one core of its complementary group to reset that core when the input means is producing a binary "0" output without applying any magnetizing force to the second core when the input means is producing a binary "0" output, and for applying a magnetizing force to the second core when the input means is producing a binary "1" output without applying a magnetizing force to the first core when the the input means is producing said binary "1" output, means connected to each input means for causing the latter to produce one or the other of its two outputs, a pulse generator, a plurality of series circuits each including half as many coils as there are cores, each coil being on one of said cores, each series circuit being fed by said pulse generator, a diode in each series circuit whereby the device has gain, sum output means including those of said series circuits the coils of which are located on such selected cores that pulses from the pulse generator will find at least one of the series circuits that is included in the sum output means with low impedance whenever there should be a sum output, the sum output means including a sum output terminal fed by the combined outputs of said series circuits that are included in the sum output means, and carry output means including those of said series circuits the coils of which are selectively located on such selected cores that at least one series circuit included in the carry output means will have low impedance to a pulse from said pulse generator whenever there should be a carry output, said carry output means including a carry output terminal fed by the combined outputs of the series circuits of the carry output means.

20. A device for subtracting binary numbers comprising a plurality of groups of cores with two cores in each group, input means for and complementary to each group of cores, each input means having two outputs respectively representing binary "0" and binary "1" and including means for applying a magnetizing force to one core of its complementary group to reset that core when the input means is producing a binary "0" output without applying any magnetizing force to the second core when the input means is producing said binary "0" output and for applying a magnetizing force to the second core when the input means is producing a binary "1" output without applying a magnetizing force to the first core when the input means is producing said binary "1" output, means connected to each input means for causing the latter to produce one or the other of its two outputs, a pulse generator, a plurality of series circuits each including half as many coils as there are cores, each coil being on one of said cores, each series circuit being fed by said pulse generator, a diode in each series circuit whereby the device has gain, sum output means including those of said series circuits the coils of which are located on such selected cores that pulses from the pulse generator will find at least one of the series circuits that is included in the sum output means with low impedance whenever there should be a sum output, said sum output means including a sum output terminal fed by the combined outputs of said series circuits that are included in the sum output means, and borrow output means including those of said series circuits the coils of which are located on such selected cores so that at least one series circuit included in the borrow output means will have low impedance to a pulse from said pulse generator whenever there should be a borrow output, said borrow means including a borrow output terminal fed by the combined outputs of the series circuits that are included in the borrow output means.

21. A device as defined in claim 17, in which each input means is of the magnetic amplifier type and includes core means, means for producing pulses during the spaces between the previously mentioned pulses, two coils respectively on the core means of each input means for controlling the last-mentioned pulses, and two windings respectively in series with the two coils of each input means and respectively located on the two cores complementary to the input means.

22. A device as defined in claim 18, in which each input means is of the magnetic amplifier type and includes core means, means for producing pulses during the spaces between the previously mentioned pulses, two coils respectively on the two core means of each input means for controlling the last-mentioned pulses, and two windings respectively in series with the two coils of each input means and respectively located on the two cores complementary to the input means.

23. A device as defined in claim 19, in which each input means is of the magnetic amplifier type and includes core means, means for producing pulses during the spaces between the previously mentioned pulses, two coils respectively on the core means of each input means for controlling the last-mentioned pulses, and two windings respectively in series with the two coils of each input means and respectively located on the two cores complementary to the input means.

24. A device as defined in claim 20, in which each input means is of the magnetic amplifier type and includes core means, means for producing pulses during the spaces between the previously mentioned pulses, two coils respectively on the core means of each input means for controlling the last-mentioned pulses, and two windings respectively in series with the two coils of each input means and respectively located on the two cores complementary to the input means.

25. A device for adding binary numbers as defined in claim 3 in which said plurality of groups of cores consists of three groups of cores, the input means for one of said groups being a carry input and the other two input means constituting inputs for numbers to be added.

26. A device for adding binary numbers comprising a plurality of groups of cores with two cores in each group, input means for and complementary to each group of cores, each input means having two outputs respectively representing binary "0" and binary "1" and including means for applying a magnetizing force to one core of its complementary group when producing a binary "0" output and for applying a magnetizing force to the other core of its complementary group when producing a binary "1" output, means connected to each input means for causing the latter to produce one of the other of its two outputs, sum output means inductively coupled to said cores for producing a sum output signal, and carry output means inductively coupled to said cores for producing a carry output signal, said carry output means including a part of said sum output means.

References Cited in the file of this patent

Report R–221, "A Magnetic Matrix Switch and Its Incorporation Into a Coincident-Current Memory," by Kenneth H. Olsen, published by Digital Computer Laboratory, Massachusetts Institute of Technology, Cambridge 39, Massachusetts, June 6, 1952.

Notice of Adverse Decision in Interference

In Interference No. 90,307 involving Patent No. 2,819,019, E. W. Yetter, Binary adding and subtracting device, final judgment adverse to the patentee was rendered July 26, 1962, as to claims 3 and 11.

[*Official Gazette December 4, 1962.*]